United States Patent
Suzuki et al.

(10) Patent No.: US 8,588,197 B2
(45) Date of Patent: Nov. 19, 2013

(54) WIRELESS RESOURCE ALLOCATION CONTROL SYSTEM, ROAD-SIDE UNIT, WIRELESS RESOURCE ALLOCATION CONTROL METHOD AND STORAGE MEDIUM STORING PROGRAM THEREOF

(75) Inventors: Yusuke Suzuki, Kawasaki (JP); Hideki Inaba, Kawasaki (JP); Hiroki Hayashi, Kawasaki (JP); Junichi Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1001 days.

(21) Appl. No.: 12/337,816

(22) Filed: Dec. 18, 2008

(65) Prior Publication Data
US 2009/0161644 A1 Jun. 25, 2009

(30) Foreign Application Priority Data
Dec. 25, 2007 (JP) ................................ 2007-332865

(51) Int. Cl.
*H04W 4/00* (2009.01)
*G06F 19/00* (2011.01)

(52) U.S. Cl.
USPC .......................................... 370/341; 701/117

(58) Field of Classification Search
USPC ........................................ 370/328–330, 341
See application file for complete search history.

(56) References Cited

U.S. PATENT DOCUMENTS
6,246,955 B1 * 6/2001 Nishikawa et al. ............ 701/117

FOREIGN PATENT DOCUMENTS
| JP | 11-306490 | 11/1999 |
| JP | 2001-112059 | 4/2001 |
| JP | 2001-223660 | 8/2001 |
| JP | 2005-100231 | 4/2005 |

* cited by examiner

*Primary Examiner* — Afshawn Towfighi
(74) *Attorney, Agent, or Firm* — Katten Muchin Rosenman LLP

(57) ABSTRACT

A wireless resource allocation control system for allocating and releasing wireless resource used for communication between vehicles in a predetermined area is provided. The control system includes a unit mounted on a vehicle, and the unit includes a transmitter for transmitting first information associated with the vehicle. A station receives information from the unit and sends information to the unit. The station calculates a priority level for each of the units on the basis of the first information transmitted from each of the units, ranks the units in the order of the priority level, allocates wireless resources to the units in descending of the priority levels, and releases the wireless resource previously allocated to the unit in the case of the unit unworthy of current allocation of the wireless resource.

7 Claims, 15 Drawing Sheets

| CAR ID | PRIORITY LEVEL TRASITION INFORMATION | ALLOCATION TS |
|---|---|---|
| Yokohama xx A xx-xx | 1-2-3-4-5 | TS#0 |
| ITS- xxx-FUJITSU-xxxx | 1-1-2-1-0 | TS=off |
| xxx.xxx.xxx.xxx | 1-3-5-5-1 | TS#2 |
| ..... | ..... | ..... |

EXAMPLES OF CAR ID: A LICENCE PLATE, AN INTRINSIC NUMBER, AN IP ADDRESS OF CAR MOUNTED UNIT

| SPEED (km) | LEVEL (V) |
|---|---|
| 0 | 1 |
| 0<V≦10 | 2 |
| 10<V≦30 | 3 |
| 30<V≦60 | 4 |
| 60<V | 5 |

VALUES SHOWN OF THE CASE OF THE ROAD WITH A SPEED LIMIT 60 km/h

| THE POSITION OF THE CAR-MOUNTED UNITS IN THE SERVICE AREA | LEVEL (p) |
|---|---|
| POSITION AT THE CENTER OF THE SERVICE AREA | 1 |
| POSITION AT BETWEEN AN END AND THE CENTER OF THE SERVICE AREA | 2 |
| POSITION AT AN END OF THE SERVICE AREA | 3 |

Fig. 5

| RELATIONSHIP A CAR MOUNTED UNIT AND A SERVICE AREA | Level (a) |
|---|---|
| A CAR MOUNTED UNIT IN THE OUTSIDE OF THE ASSUMED SERVICE AREA | 0 |
| A CAR MOUNTED UNIT IS IN THE INSIDE OF THE ASSUMED SERVICE AREA | 1 |

Fig. 6

| CONGESTION INFORMATION | Level(j) |
|---|---|
| A CAR MOUNTED UNIT SET IN A CAR IN A TRAFFICY SPOT | 1 |
| A CAR MOUNTED UNIT SET IN A CAR APPROACHING A TRAFFICY SPOT | 2 |
| A CAR MOUNTED UNIT SET IN A CAR LEAVING A TRAFFICY SPOT | 3 |
| A CAR MOUNTED UNIT SET IN A CAR HAVING NOTHING TO DO WITH A TRAFFICY SPOT | 3 |

Total Priority Level=(Level(v)+Level(p)+Level(j)) × Level(a)

| STATE OF THE NEAREST SIGNAL INFORMATION | Level(s) |
|---|---|
| RED | 1 |
| YELLOW | 2 |
| INDIGO | 4 |

Fig. 13

Total Priority Level=(Level(v)+Level(p)+Level(j)+Level(s)) × Level(a)

Fig. 14

WIRELESS RESOURCE ALLOCATION CONTROL SYSTEM, ROAD-SIDE UNIT, WIRELESS RESOURCE ALLOCATION CONTROL METHOD AND STORAGE MEDIUM STORING PROGRAM THEREOF

BACKGROUND

1. Field

The present invention relates to a wireless resource allocation control system, road-side unit, wireless resource allocation control method and wireless resource allocation control program in which a road-side unit placed on a road allocates and releases a wireless resource to and from vehicle-mounted units, each of which is mounted in a vehicle, in a predetermined area in which a vehicle-mounted unit and the other vehicle-mounted unit use a wireless resource to communicate.

2. Description of the Related Art

Hitherto, in order to implement services for aiming improvement of security, improvement of efficiency of transportation and improvement of comfort, an Intelligent Transport System (ITS) has been known in which roads and vehicles are integrated. This system attempts to implement the services through road-to-vehicle communication, which is performed between a base station (road-side unit) placed on a road and a mobile station (or vehicle-mounted unit) mounted in a vehicle, and a vehicle-to-vehicle communication, which is performed between mobile stations, (refer to Japanese Laid-open Patent Publication No. 11-306490).

Those services adopt a synchronous time-division communication method performing road-to-vehicle communication through spot communication (ad hoc communication) only within a road-to-vehicle area, which is limited as a communication area, performing full-duplex communication using different frequencies between communication from a base station to a mobile station and communication from the mobile station to the base station. Further in this the full-duplex communication, a communication frame comprises time-dived fixed lengths called slot. The communication is performed between one base station and multiple mobile stations (refer to Japanese Unexamined Laid-open Patent Publication No. 2001-112059 and No. 2005-100231).

The communication employing the synchronous time-division communication method requires the allocation of a slot, which is a wireless resource, to a vehicle-mounted unit by a road-side unit. For example, as a method for allocating slots, a technology has been known in which a base station allocates a time slot to mobile stations in order of the time that they request communication (refer to Japanese Laid-open Patent Publication No. 2001-223660).

Since a base station allocates time slots to mobile stations in order of the time they request communication in the conventional technology, the allocation of time slots to mobile stations in order of the time they request communication may result in the problems of the cases where communication is disabled since no time slot is allocated to a mobile station that highly requires information within a service area or, conversely, a time slot is allocated to a mobile station that less requires the information within a service area, which waists wireless resources.

SUMMARY

The object of the present is directed to allow a vehicle-mounted unit having a high requirement for information to perform communication may be allowed a more secure communication than that by a vehicle-mounted unit having a lower requirement and effectively use wireless resources by reducing the waste of wireless resources.

According to an aspect of the invention, there is a wireless resource allocation control system in which a road-side unit placed on a road or the vicinity allocates and releases wireless resources to and from vehicle-mounted units, each of which is mounted in a vehicle, within a predetermined area in which a vehicle-mounted unit and the other vehicle mounted unit communicate by using wireless resources, wherein the vehicle-mounted unit includes own-vehicle information transmitting unit for transmitting own-vehicle information on a vehicle having the vehicle-mounted unit to the road-side unit, and the road-side unit includes priority level calculating unit for calculating the priority level of each of the vehicle-mounted units based on the own-vehicle information, which is transmitted by the own-vehicle information transmitting unit, ranking unit for ranking the vehicle-mounted units according to the priority levels calculated by the priority level calculating unit, wireless resource allocating unit for allocating wireless resources in order from a vehicle-mounted vehicle with a highest priority level among the vehicle-mounted units ranked by the ranking unit and wireless resource releasing unit for releasing a wireless resource of a vehicle-mounted unit with a low priority level to which no wireless resources have been allocated by the wireless resource allocating unit.

Since the disclosed system allocates a wireless resource to a vehicle-mounted unit that highly requires information and forcibly releases the wireless resource from the vehicle-mounted unit that less requires information, the system provides effects that the vehicle-mounted unit that highly requires information can perform communication securely and that wireless resources can be effectively used as a result of the release of wireless resources of vehicle-mounted units that less require information to reduce the waste of wireless resources.

BRIEF DESCRIPTION OF THE DRAWINGS

FIG. 5 shows an example of a priority table;

FIG. 6 shows an example of a priority table;

FIG. 13 shows an example of a priority table;

FIG. 14 shows an example of an expression to calculate a level of priority;

DESCRIPTION OF THE PREFERRED EMBODIMENTS

With reference to attached drawings, embodiments of a wireless resource allocation control system, road-side unit, wireless resource allocation control method and wireless resource allocation control program according to the present embodiment will be described in detail below.

[First Embodiment]

A general outline and characteristics of a wireless resource allocation control system according to a first embodiment, a configuration and processing flow of the wireless resource allocation control system will be described step by step, and finally effects of the first embodiment will be described. Notably, a case that the embodiment is applied to the control on the wireless resource allocation will be described below.

[eneral Outline and Characteristics of Wireless Allocation Control System According to First Embodiment]

Figure 1:
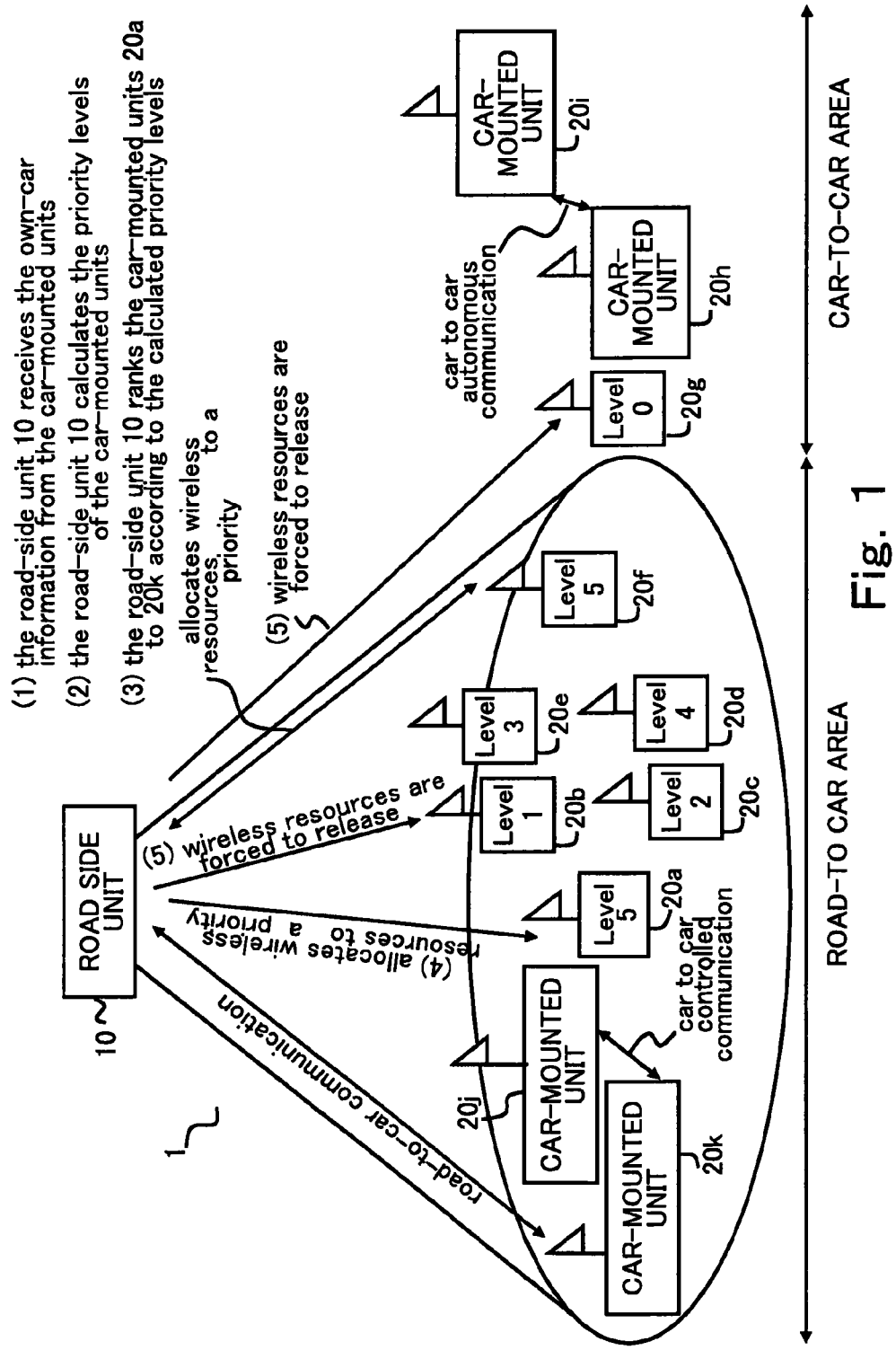
FIG. 1 shows a schematic diagram according to a first embodiment for explain an overview and a feature.

First of all, with reference to FIG. 1, a general outline and characteristics of a wireless resource allocation control system according to a first embodiment will be described. FIG. 1 is a diagram for explaining a general outline and characteristics of a wireless resource allocation control system according to a first embodiment.

According to a general outline of a wireless resource allocation control system 1 of a first embodiment, a road-side unit placed on a road (a station preferably located by a road or at a vicinity of the road at which the station may communicated with vehicle each other) allocates and releases wireless resources to and from vehicle-mounted units, each of which is mounted in a vehicle, within a predetermined area in which a vehicle-mounted unit and the other vehicle-mounted unit use a wireless resource to communicate. The wireless resource allocation control system 1 has a main characteristic that wireless resources can be effectively used by allowing a vehicle-mounted unit that highly requires information within a service area to securely communicate and reducing the waste of wireless resources.

Describing the main characteristic more specifically, vehicle-mounted units 20a to 20k of the wireless resource allocation control system 1 transmit own-vehicle information (or vehicle information) on vehicles having them to a road-side unit 10. Then, the road-side unit 10 receives the own-vehicle information from the vehicle-mounted units 20a to 20k (refer to (1) in FIG. 1). More specifically, the vehicle-mounted units 20a to 20k obtain own-vehicle information from the outside of the vehicle-mounted units. Here, examples of the own-vehicle information may include speed information, which is obtained from the number of revolutions of the vehicle engine (or probe information), positional information, which is obtained from a GPS receiver, vehicle's direction-of-travel information, which is obtained from speed information and positional information, planned driving route of a vehicle, which may be obtained from a navigation system, and/or destination information of a vehicle, for example. All or some of those own-vehicle information pieces are notified to a road-side unit periodically.

Then, the road-side unit 10 calculates the priority levels of the vehicle-mounted units 20a to 20k based on the own-vehicle information transmitted from the vehicle-mounted units 20a to 20k (refer to (2) in FIG. 1). More specifically, the road-side unit 10 calculates the priority levels of all of the vehicle-mounted units 20a to 20k that have transmitted own-vehicle information based on the own-vehicle information notified from the vehicle-mounted units 20a to 20k, traffic information obtained from the own vehicle information of all vehicle-mounted units present within a service area and the determination on whether the subject vehicle-mounted units are within the service area or not. In the example in FIG. 1, the priority level "5" is calculated for the vehicle-mounted unit 20a, and the priority level "0" is calculated for the vehicle-mounted unit 20g outside of the service area.

Then, the road-side unit 10 ranks the vehicle-mounted units 20a to 20k according to the calculated priority levels (refer to (3) in FIG. 1) and allocates wireless resources to the vehicle-mounted units in the order of priority (refer to (4) in FIG. 1). In other words, time slots are allocated in order from the vehicle-mounted unit with a highest priority level, and, if the number of vehicle-mounted units within a service area is lower than the number of time slots, time slots are allocated to all vehicle-mounted units within the service area in decreasing order of priority levels.

On the other hand, the wireless resources are released from vehicle-mounted units with lower priority levels to which no wireless resources have been allocated (refer to (5) in FIG. 1). In other words, if the number of vehicle-mounted units within a service area is higher than the number of time slots, the road-side unit 10 allocates the time slots to vehicle-mounted units in decreasing order of priority levels, and the time slots are forcibly released from vehicle-mounted units with low priority levels to which no time slots have been allocated. Referring to the example in FIG. 1, the road-side unit 10 gives priority to the vehicle-mounted unit 20a with a higher priority level to allocate a wireless resource and forcibly releases the wireless resource from the vehicle-mounted unit 20b with a lower priority level.

In this way, the wireless resource allocation control system 1 allocates wireless resources to vehicle-mounted units that highly require information and forcibly releases the wireless resources from vehicle-mounted units that less require information. Therefore, the vehicle-mounted units that highly require information can perform communication securely, and the waste of wireless resources can be reduced by releasing the wireless resources from vehicle-mounted units that less require information. As a result, as in the main characteristic, the wireless resources can be used effectively.

[Configuration of Road-Side Unit]

Figure 2:
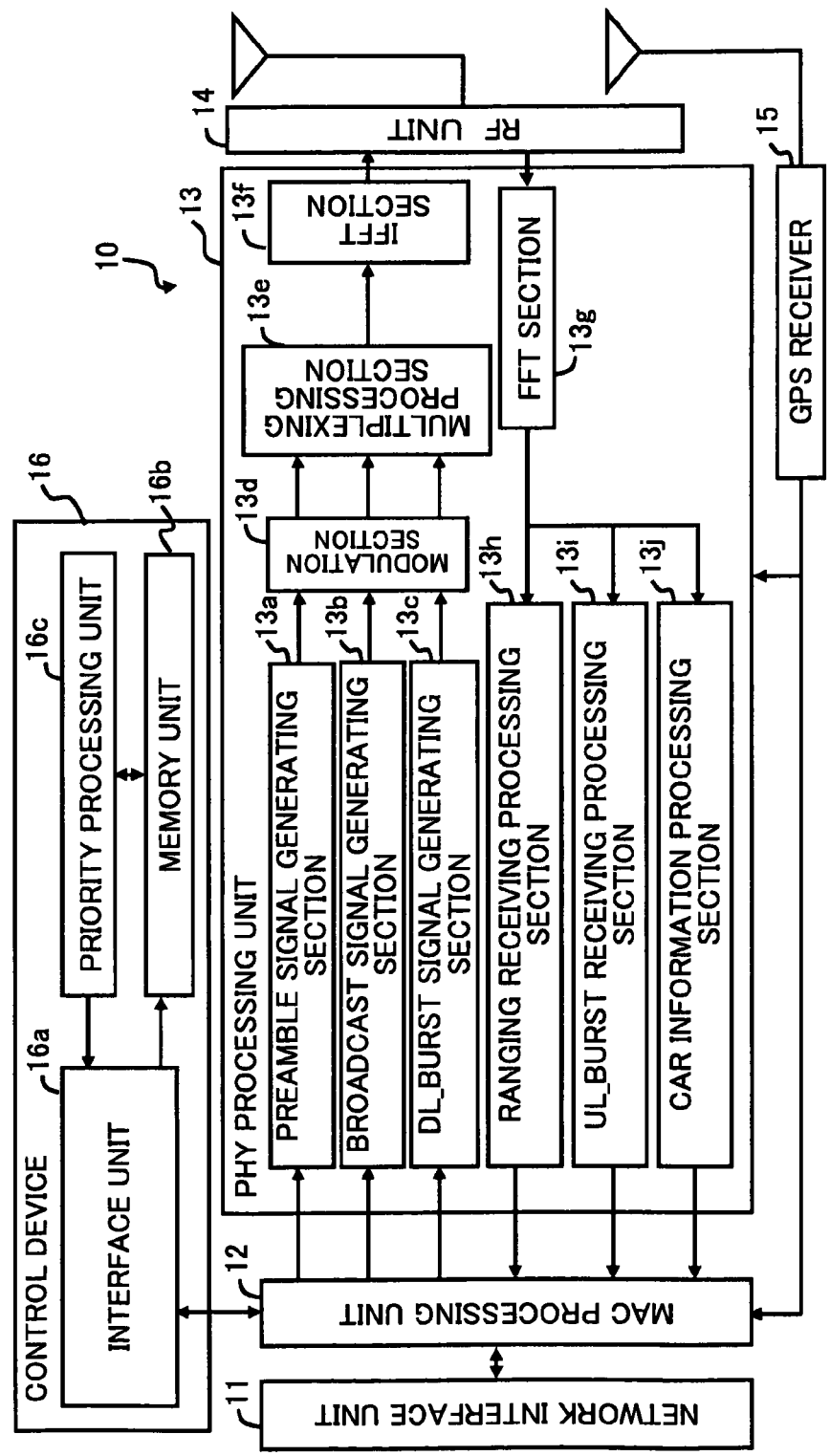
FIG. 2 shows a schematic configuration of a road-side unit according to a first embodiment.

Next, with reference to FIG. 2, the configuration of the road-side unit 10 shown in FIG. 1 will be described. FIG. 2 is a block diagram showing a configuration of the road-side unit 10 according to the first embodiment. As shown in FIG. 2, the road-side unit 10 includes a network interface unit 11, a Media Access Control (MAC) processing unit 12, a Physical Layer (PHY) processing unit 13, a Radio Frequency (RF) unit 14, a Global Positioning System (GPS) receiver 15 and a control device 16. The processing by those components will be described below. Though the communication system may adopt either Time Divisional Multiple Access (TDMA) or Orthogonal Frequency Division Multiplex (A) (OFDM(A)), the case that OFDM(A) is adapted according to this embodiment will be described.

The network interface unit 11 has an interface function of inputting traffic information (such as nearest signal information the nearest traffic light, nearest signal state transition information and traffic accident information) of the inside of a service area network to the road-side unit 10 and transmitting it to the MAC processing unit 12. The MAC processing unit 12 has an MAC layer function of performing encoding and/or error correction on transmit data. The RF unit 14 has a transmitting/receiving function of converting a base band signal to a wireless frequency or converting a wireless frequency to a base band signal and transmits a health check signal that checks the communication state of a vehicle-mounted unit to each vehicle-mounted unit periodically. The GPS receiver 15 has a function of generating a reference time for synchronizing the road-side unit 10 and the vehicle-mounted unit 20 and an internal timing signal.

The PHY processing unit 13 includes transmitting functions and receiving functions. The transmitting functions include a Preamble signal generating section 13a that generates a Preamble signal, a Broadcast signal generating section 13b that generates a Broadcast signal, a DL_Burst signal generating section 13c that generates a down link Burst signal that vehicles transmit data, a Modulation section 13d that performs the modulation processing instructed from the MAC processing unit 12, a multiplexing processing section 13e that performs processing of multiplexing a signal, and an IFFT section 13f.

The receiving functions of the PHY processing unit 13 include an FFT section 13g that performs FFT processing on a signal at a base band level, a Ranging receiving processing section 13h that detects a Ranging signal from a receive signal, a UL_Burst receiving processing section 13i that performs processing of receiving a UL_Burst signal in the area subject to the UL_MAP instruction from the MAC processing unit 12 and a vehicle information processing section 13j that performs processing of receiving vehicle information from the vehicle-mounted unit 20.

The control device 16 has an internal memory for storing a program that defines a processing routine and required data and executes various processing by using them. The control device 16 includes an interface unit 16a, a memory unit 16b and a priority processing unit 16c, which closely relate to the present invention. The priority processing unit 16c corresponds to "priority level calculating means", "ranking means", "wireless resource allocating means" and "wireless resource releasing means".

The memory unit 16b stores a "management table" (refer to FIG. 3) that manages time stamps, which are allocated wireless resources, and a "priority table" (refer to FIGS. 4 to 7) having correspondence between parameters of own-vehicle information and the values of priority levels. More specifically, the management table 600 stores, as illustrated in FIG. 3, a "vehicle ID" 602 that uniquely identifies a vehicle, such as number plate information, vehicle unique information and an IP address of a vehicle-mounted unit, a "priority level transition information" 604 that indicates the transition in priority levels and an "allocation TS" 606 that indicates the allocated time stamp in connection.

FIGS. 4 to 7 show priority tables 610, 620, 630, and 640 respectively. The priority table is a table that stores a priority level according to a speed, a priority level according to a position, a priority level according a position inside or outside of a service area and a priority level according to congestion information, as illustrated in FIGS. 4 to 7. From the parameters (such as the shown "Level(v)" 612, "Level(p)" 622, "Level(a)" 632 and "Level (j)") 642 of the priority level, the priority levels of all vehicle-mounted units are calculated (refer to the shown "Total Priority Level" in FIG. 8).

Figures 3, 4:
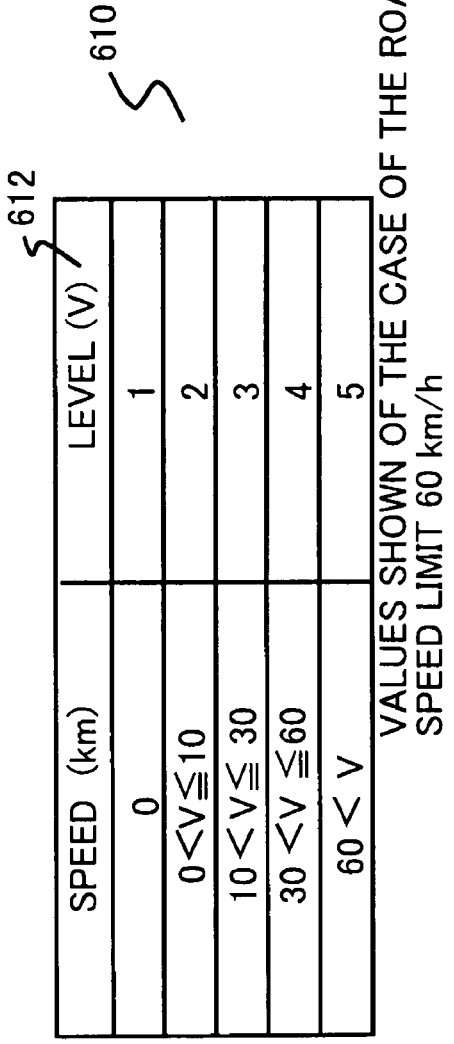
FIG. 3 shows an example of a management table stored in a memory unit shown in FIG. 2.
FIG. 4 shows an example of a priority table.

In the example of the priority table 610 shown in FIG. 4, vehicle-mounted units are ranked according to the speeds, and it is set that the necessity of information by a vehicle-mounted unit and the priority level increase as the speed of the vehicle-mounted unit increases. In other words, since a slower vehicle may be stopped or be delayed, the vehicle has a lower necessity for obtaining information and has a later opportunity to obtain the information. Therefore, the vehicle is set to rank lower. On the other hand, since a faster vehicle may highly require traffic information for driving the vehicle, the vehicle is set to rank higher to prioritize. FIG. 4 illustrates an example of the case of the road with a speed limit of 60 km/h.

In the example of the priority table 620 shown in FIG. 5, vehicle-mounted units are ranked according to the positions of the vehicle-mounted units. In the example in FIG. 5, the priority table 620 sets that a vehicle-mounted unit that has just entered into a service area, positions at an end of the service area and therefore highly requires information is ranked higher while a vehicle-mounted unit that positions at the center of the service area and therefore less requires information is ranked lower. In other words, since a vehicle-mounted unit that has just entered into a service area has a higher possibility that it has not received any service such as obtaining information, it is set to rank to prioritize. A vehicle-mounted unit positioned at the center of a service area has a higher possibility that it has been serviced already, it is set to rank lower.

In the example of the priority table shown in FIG. 6, vehicle-mounted units are ranked according to the positions inside or outside of a service area. In the example in FIG. 6, the priority table ranks a vehicle mounted unit inside of a service area as "1" and ranks a vehicle-mounted unit outside of the service area as "0". The priority level of a vehicle-mounted unit outside of a service area is always ranked "0" in the priority level calculating method example in FIG. 8, as will be described later with reference to FIG. 8.

Figures 7, 8:
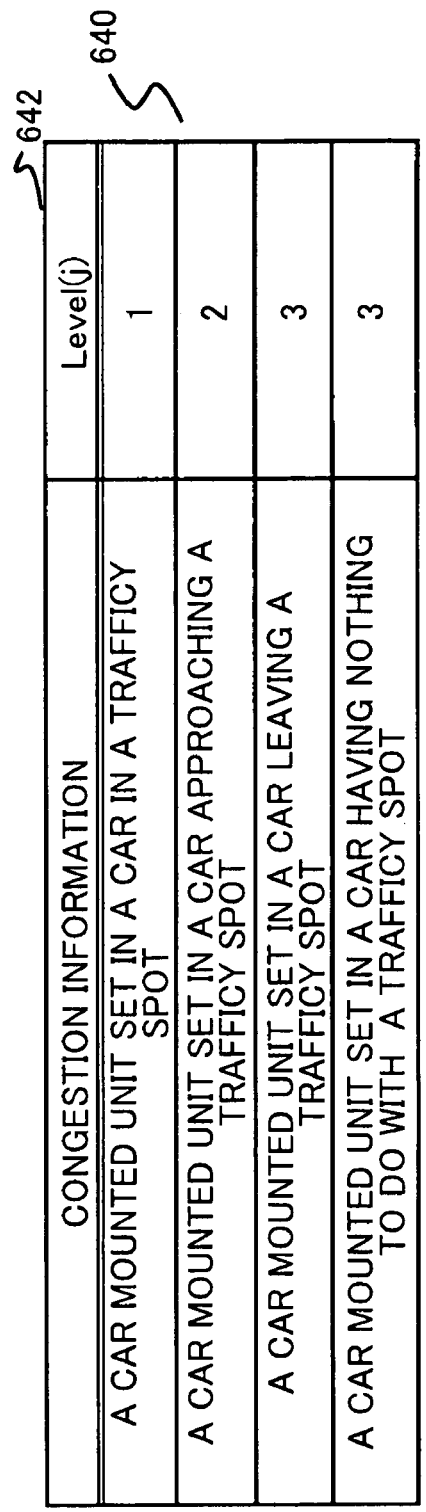
FIG. 7 shows an example of a priority table.
FIG. 8 shows an example of an expression to calculate a level of priority.

In the example of the priority table shown in FIG. 7, vehicle-mounted units are ranked according to the congestion information. In the example in FIG. 7, a delayed vehicle-mounted unit is set to rank lower since the delayed vehicle-mounted unit less requires information. Conversely, a vehicle-mounted unit having nothing to do with congestion is set to rank higher since the vehicle-mounted unit highly requires information. In other words, a delayed vehicle is set to rank lower since it may have a lower necessity for obtaining information and have a later opportunity for obtaining information. On the other hand, a vehicle having nothing to do with congestion is set to rank for priority since it may have a higher necessity for traffic information, for example, for driving the vehicle.

The priority processing unit 16c calculates the priority levels of the vehicle-mounted units 20a to 20k based on the own-vehicle information transmitted from the vehicle-mounted units 20a to 20k and ranks the vehicle-mounted units 20a to 20k according to the calculated priority levels. The priority processing unit 16c further has a function of inputting the result to the MAC processing unit 12.

More specifically, the priority processing unit 16c in the road-side unit 10 calculates the priority levels of all of the vehicle-mounted units 20a to 20k that have transmitted the own-vehicle information based on the own-vehicle information notified by the vehicle-mounted units 20a to 20k, traffic information obtained from the own-vehicle information of all of the vehicle-mounted units present within a service area and the determination on whether each of the vehicle-mounted units exists within the service area or not.

Here, describing an example of the method for calculating a priority level with reference to FIG. 8, the parameters "Level(v)" 612, "Level(p)" 622, and "Level(j)" 642 of the priority levels are added, and the added value is multiplied by "Level (a)" 632. Thus, the priority level (which is "Total Priority Level" in FIG. 8) is calculated. By using such a calculation method, the priority levels of all vehicle-mounted units are calculated.

[Configuration of Vehicle-Mounted Unit]

Figure 9:
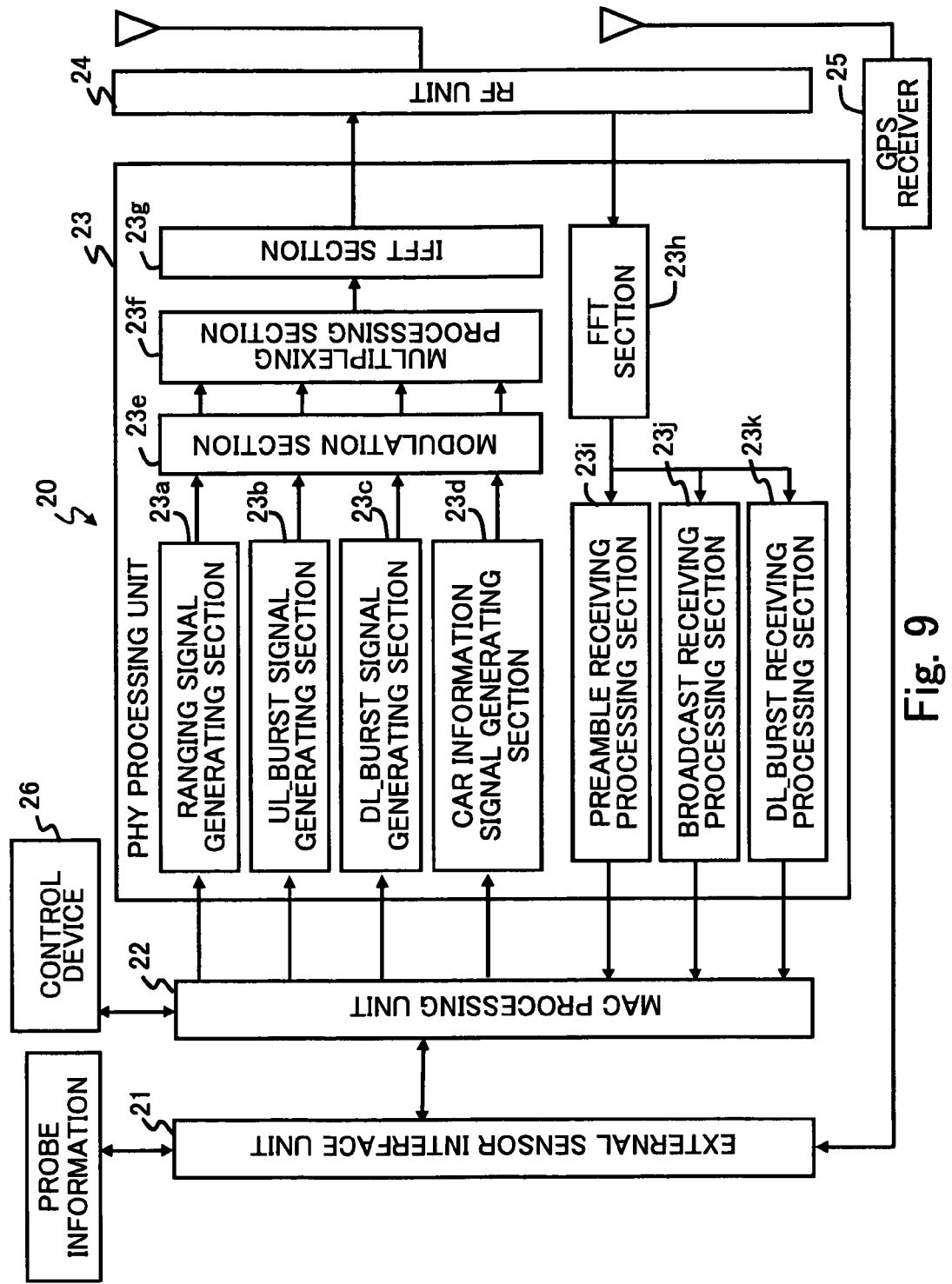
FIG. 9 shows a schematic diagram of a vehicle mounted unit shown in FIG. 1.

Next, with reference to FIG. 9, the configuration of the vehicle-mounted unit 20 shown in FIG. 1 will be described. FIG. 9 is a block diagram showing a configuration of the vehicle-mounted unit 20 according to the first embodiment. As shown in FIG. 9, the vehicle-mounted unit 20 includes an external sensor interface unit 21, a MAC processing unit 22, a PHY processing unit 23, an RF unit 24, a GPS receiver 25 and a control device 26. The processing by those components will be described below.

The external sensor interface unit 21 for a vehicle has functions of receiving speed information and vehicle information from the outside of the vehicle-mounted unit and notifying it to the MAC processing unit 22 and a function of notifying information from the road-side unit 10, which is notified from the MAC, to the outside of the vehicle-mounted unit. The MAC processing unit 22 has a MAC layer function of performing encoding and/or error correction on transmit data.

The RF unit 24 has a transmitting/receiving function of converting a base band signal to a signal in a wireless frequency or converting a signal in a wireless frequency to a base band signal and transmits a response signal to a health check signal from the road side unit 10 as a signal indicating that the own vehicle is within a predetermined area. The GPS receiver 25 has a function of generating a reference time for synchronizing the road-side unit 10 and the vehicle-mounted unit 20 and an internal timing signal. The control device 26 has a function of performing control based on received information.

The PHY processing unit 23 includes transmitting functions and receiving functions. The transmitting functions include a Ranging signal generating section 23a, a UL-Burst generating section 23b that generates an uplink Burst signal for road-to-vehicle communication, a DL_Burst signal generating section 23c that generates a downlink Burst signal for vehicle-to-vehicle communication, a vehicle information signal generating section 23d that generates a vehicle information signal describing information on the own vehicle, a Modulation section 23e that performs the modulation processing instructed from the MAC processing unit 22, a multiplexing processing section 23f that multiplexes signals and an IFFT section 23g.

The receiving functions of the PHY processing unit 23 include an FFT section 23h that performs FFT processing on a signal at a base band level, a Preamble receiving processing section 23i that detects a Preamble signal from a receive signal and a DL_Burst receiving processing section 23k that performs processing of receiving a DL_Burst signal in an area subject to a DL_MAP instruction from the MAC processing unit 22.

Figure 10:
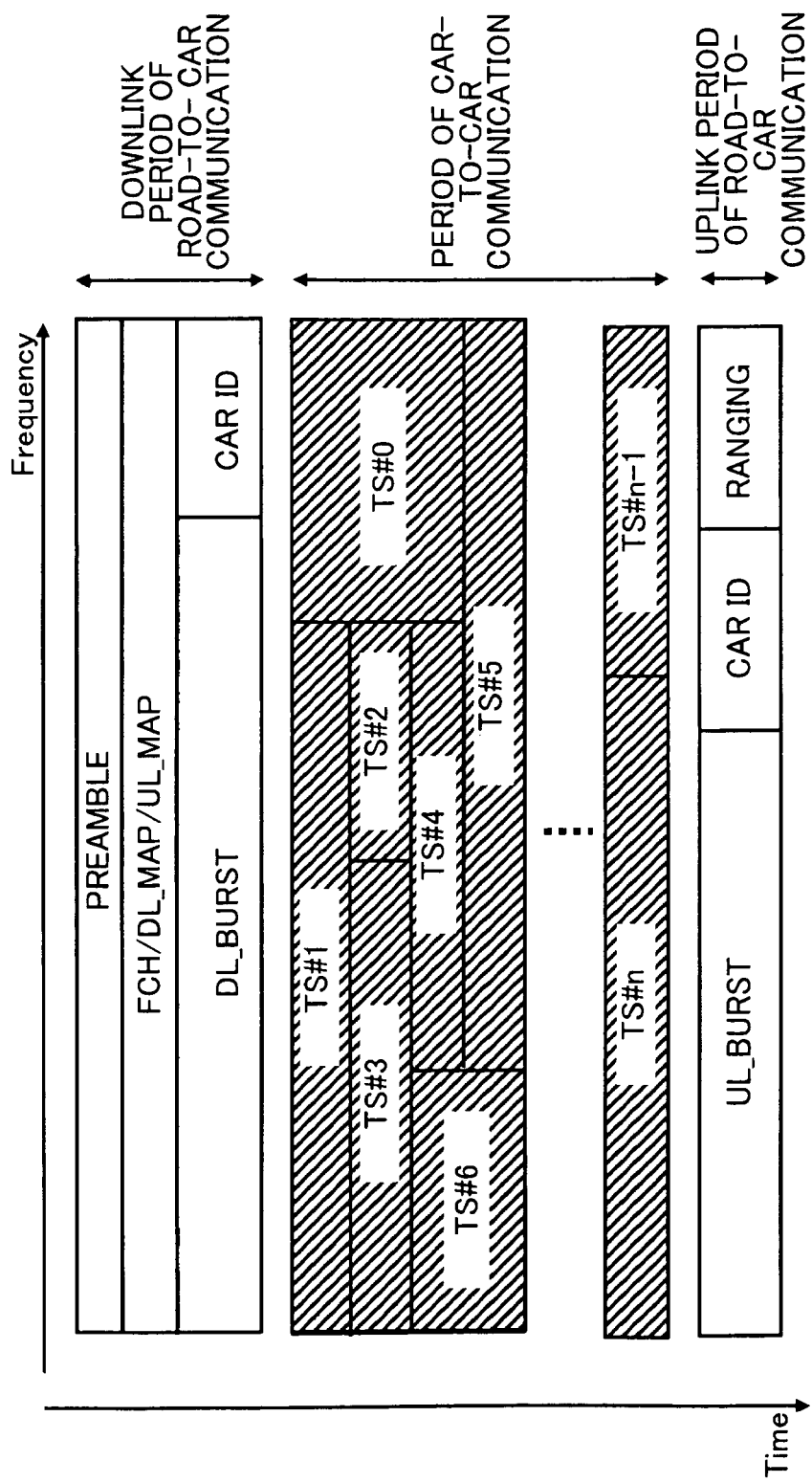
FIG. 10 shows an example of a frame configuration.

Now, with reference to FIG. 10, a frame configuration will be described. As illustrated in FIG. 10, this embodiment has a frame configuration time-divided into a frame period for performing road-to-vehicle communication and a frame period, which functions as a time slot for performing vehicle-to-vehicle communication. The modulation method adopts an orthogonal frequency division multiple access (OFDMA), and each data is divided in used frequencies based on the times and sub-carrier. The frame includes a Preamble, a Broadcast signal containing an Flame Control Header (FCH), downlink allocation information (DL_MAP) and uplink allocation information (UL_MAP), a vehicle ID, which is transmitted from a road-side unit periodically, multiple downlink Bursts and uplink Bursts that carry transmit data containing own-vehicle information and information on an allocated time slot and multiple slots.

[Processing by Wireless Resource Allocation Control System]

Figure 11:
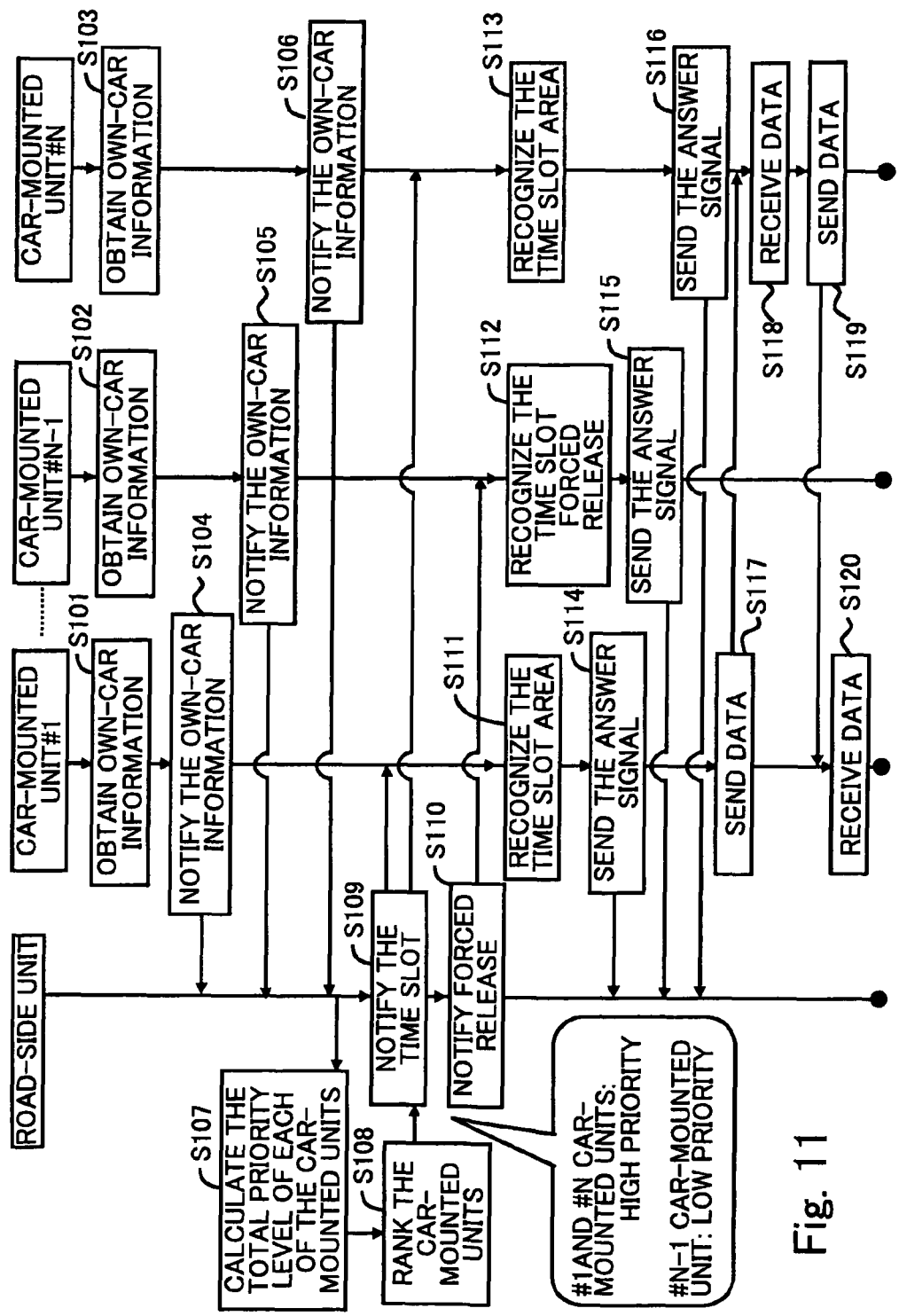
FIG. 11 shows an example of a sequence diagram of time slot allocation process in a wireless resource allocation control system according to the first embodiment.

Next, with reference to FIG. 11, processing by the wireless resource allocation control system 1 according to the first embodiment will be described. FIG. 11 is a sequence diagram showing a flow of time slot allocation control processing by a wireless resource allocation control system according to the first embodiment.

As shown in FIG. 11, each vehicle-mounted unit 20 of the wireless resource allocation control system 1 obtains own-vehicle information from the outside of the vehicle-mounted unit (steps S101 to 103). Then, the own-vehicle information is notified to a road-side unit periodically (steps S104 to 106).

Then, the road-side unit 10 calculates the priority levels of all of the vehicle-mounted units 20, which have transmitted own-vehicle information, based on the own-vehicle information notified from the vehicle-mounted units 20, traffic information obtained from the own-vehicle information of all vehicle-mounted units present within a service area and the determination on whether each of the subject vehicle-mounted units is within the service area or not (step S107).

Next, the road-side unit 10 ranks the vehicle-mounted units according to the calculated priority levels (step S108), performs processing of allocating wireless resources in order from a vehicle-mounted unit with the highest priority level. If the area of the time slot is determined, the time slot allocated area for notifying the area is notified to the vehicle-mounted unit 20 (step S109). The road-side unit 10 releases the wireless resource of a vehicle-mounted unit with a lower priority level, which has not allocated any wireless resource (step S110).

After that, the vehicle-mounted unit 20, which has allocated a time slot, recognizes the time slot area (steps S111 and 113), and the vehicle-mounted unit 20 from which the wireless resource has been released recognizes the forced release of the time slot (step S112). Then, each of the vehicle-mounted units 20 transmits the response indicating the reception of the notification to the road side unit 10 (steps S114 to S116). Then, the vehicle-mounted units 20, which have allocated time slots, use the time slots allocated from the road-side unit 10 to perform the vehicle-to-vehicle communication (steps S117 to 120).

As described above, the wireless resource allocation control system 1 allocates a wireless resource to a vehicle-mounted unit, which highly requires information, and forcibly releases the wireless resource from a vehicle-mounted unit, which less requires information. Thus, a vehicle-mounted unit, which highly requires information, can perform communication securely. Furthermore, as a result of the reduction of the waste of wireless resources by releasing the wireless resource from a vehicle-mounted unit, which less requires information, the wireless resources can be effectively used, as in the main characteristic.

[Second Embodiment]

Having described the case that priority levels are calculated based on the own-vehicle information of vehicle-mounted units according to the first embodiment, the present invention is not limited thereto. Priority levels may be calculated based on traffic information of the inside of a service area, which is obtained from the inside of the network, in addition to own-vehicle information.

Figure 12:
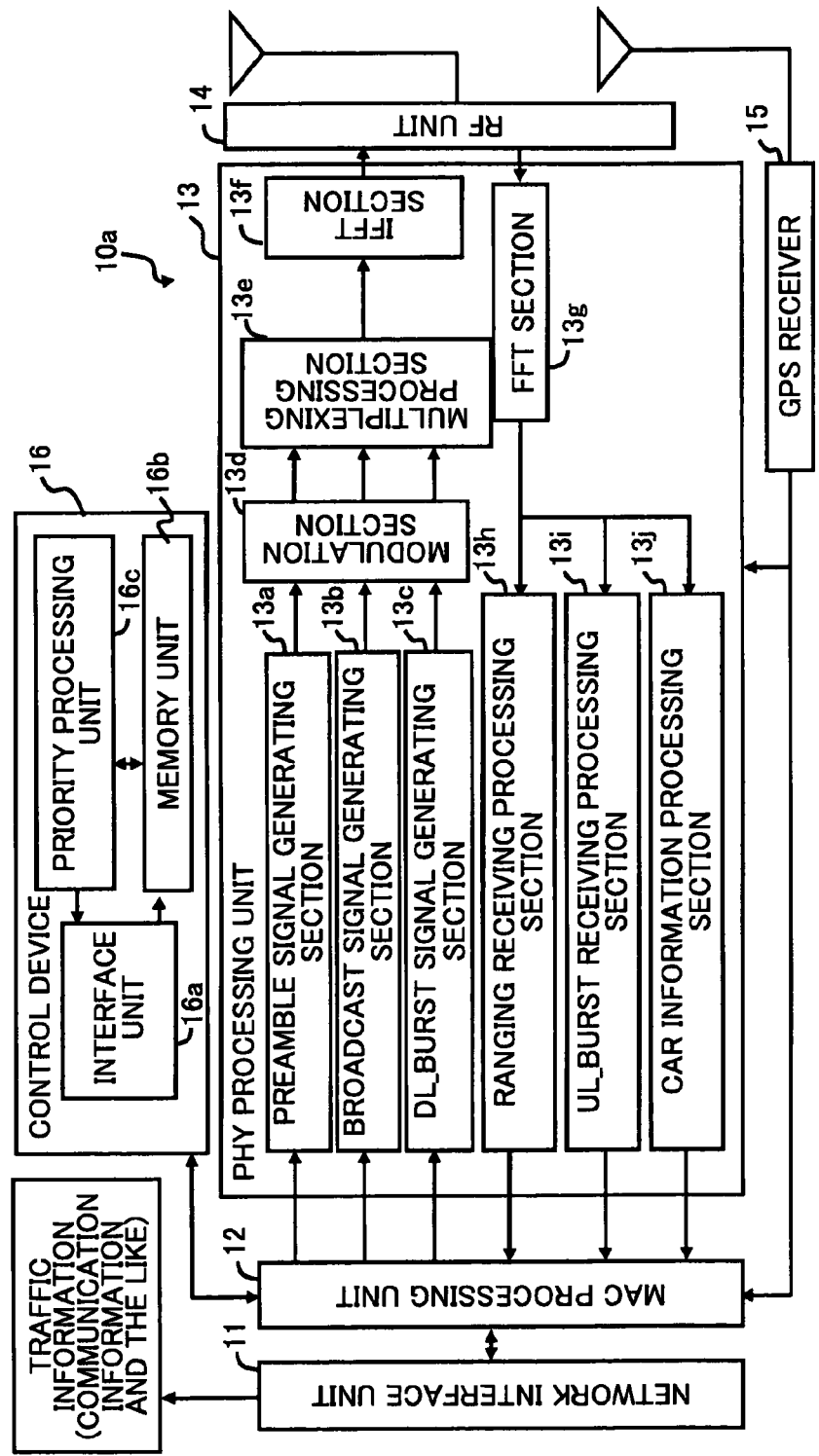
FIG. 12 shows a schematic configuration of a road-side unit according to a second embodiment.
Figure 15:
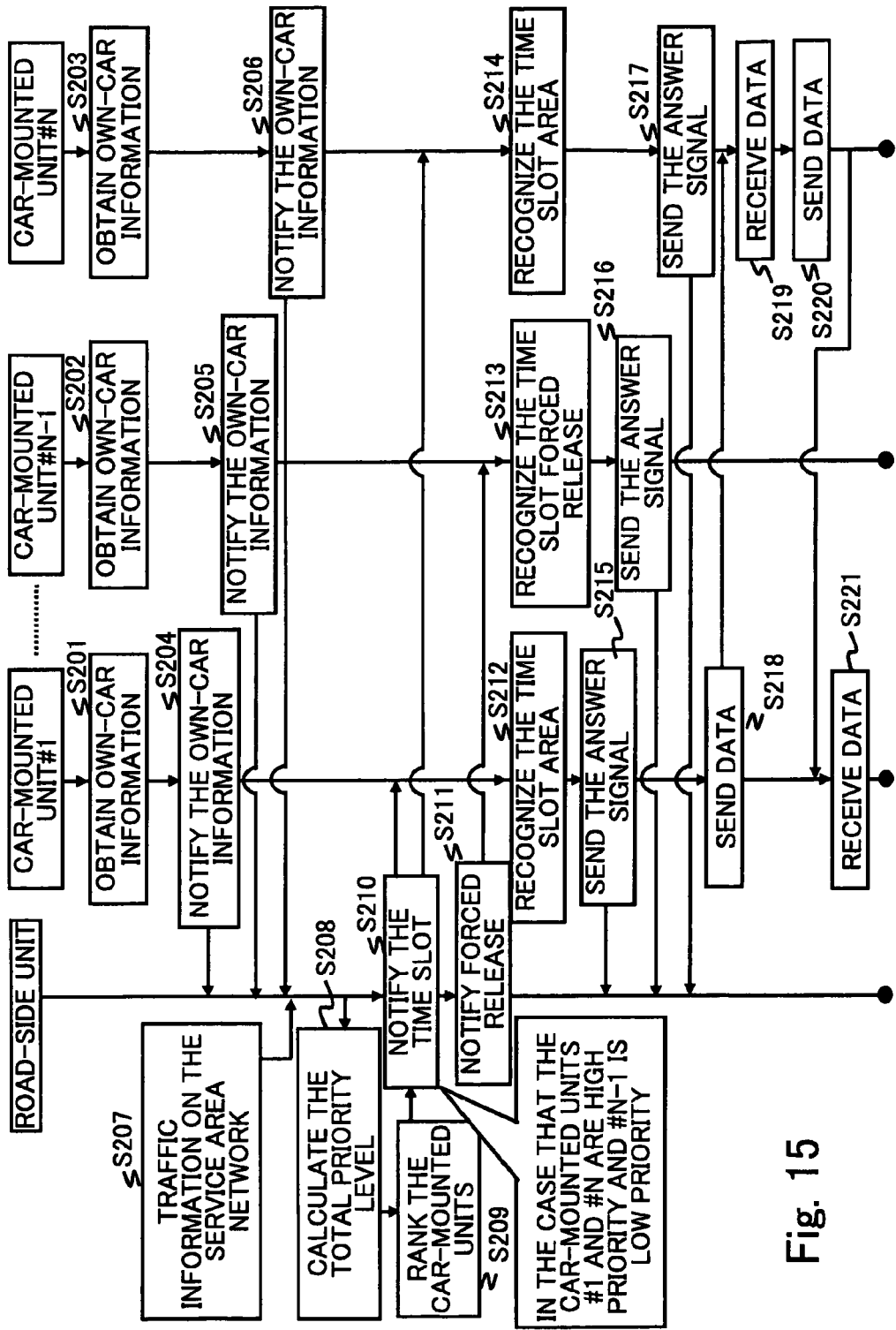
FIG. 15 shows an example of a sequence diagram of time slot allocation process in a wireless resource allocation control system according to the second embodiment.

Now, with reference to FIGS. 12 to 15, the configuration and processing in a wireless resource allocation control system 1a according to a second embodiment will be described in a case that a road-side unit obtains traffic information from the inside of a network and priority levels are calculated based on own-vehicle information and the traffic information. FIG. 12 is a block diagram showing a configuration of a road-side unit 10a according to the second embodiment. FIG. 13 is a diagram for describing an example of the priority table 660. FIG. 14 is a diagram for explaining an example of the priority level calculating method. FIG. 15 is a sequence diagram showing a flow of time slot allocation control processing by a wireless resource allocation control system according to the second embodiment.

First of all, a configuration of a road-side unit 10a according to the second embodiment will be described with reference to FIG. 12. As shown in FIG. 12, the road-side unit 10a according to the second embodiment is different from the road-side unit 10 shown in FIG. 2 in that it further includes a function of obtaining traffic information from the inside of a network. In the road-side unit 10a, a network interface unit 11 obtains traffic information from the inside of a service area network.

Then, unlike the control device 16 in the first embodiment, a memory unit 16b of a control device 16 according to the second embodiment further stores a priority table 660 storing priority levels according to traffic information parameters from the inside of a service area network, as shown in FIG. 13. More specifically, if the nearest signal state of traffic light is blue, it is set to rank high since the necessity for information is high. On the other hand, if it is red, it is set to rank low since the necessity for information is low.

A priority processing unit 16c calculates priority levels of vehicle-mounted units 20a to 20k based on own-vehicle information transmitted from the vehicle-mounted units 20a to 20k and the traffic information obtained from the inside of a service area network and ranks the vehicle-mounted units 20a to 20k according to the calculated priority levels.

Describing an example of the priority level calculation method with reference to FIG. 14, the parameter "Level(v)" 612, "Level(p)" 622, "Level(j)" 642 of the priority level and the parameter "Level(s)" 662 of the priority level from the traffic information are added, and the added value is multiplied by "Level(a)" 632 to calculate the priority level ("Total Priority Level" in FIG. 14). This calculation method is used to calculate the priority levels of all vehicle-mounted units.

Next, time slot allocation control processing by a wireless resource allocation control system according to the second embodiment will be described with reference to FIG. 15. The access control processing of the second embodiment is different from the access control processing of the first embodiment shown in FIG. 11 in that traffic information is obtained from the inside of a service area network.

That is, as shown in FIG. 15, the road-side unit 10a receives own-vehicle information from vehicle-mounted units 20 periodically (steps S201 to 206) and obtains traffic information from the inside of a service area network (step S207). Then, based on the own-vehicle information transmitted from the vehicle-mounted units 20a to 20k and the traffic information obtained from the inside of the service area, the priority levels of the vehicle-mounted units are calculated (step S208), and the vehicle-mounted units 20a to 20k are ranked according to the calculated priority levels (step S209). After that, the road-side unit 10a performs time slot allocation releasing processing (steps S210 and 211) like the first embodiment.

In this way, according to the second embodiment, more accurate priority levels of vehicle-mounted units can be calculated since the priority levels are calculated based on traffic information obtained from the inside of an area network in addition to the own-vehicle information.

[Third Embodiment]

According to the present embodiment, a time slot may be reallocated to a vehicle-mounted unit, which has been forced to release the time slot, if the necessity for information increases later.

Figure 16:
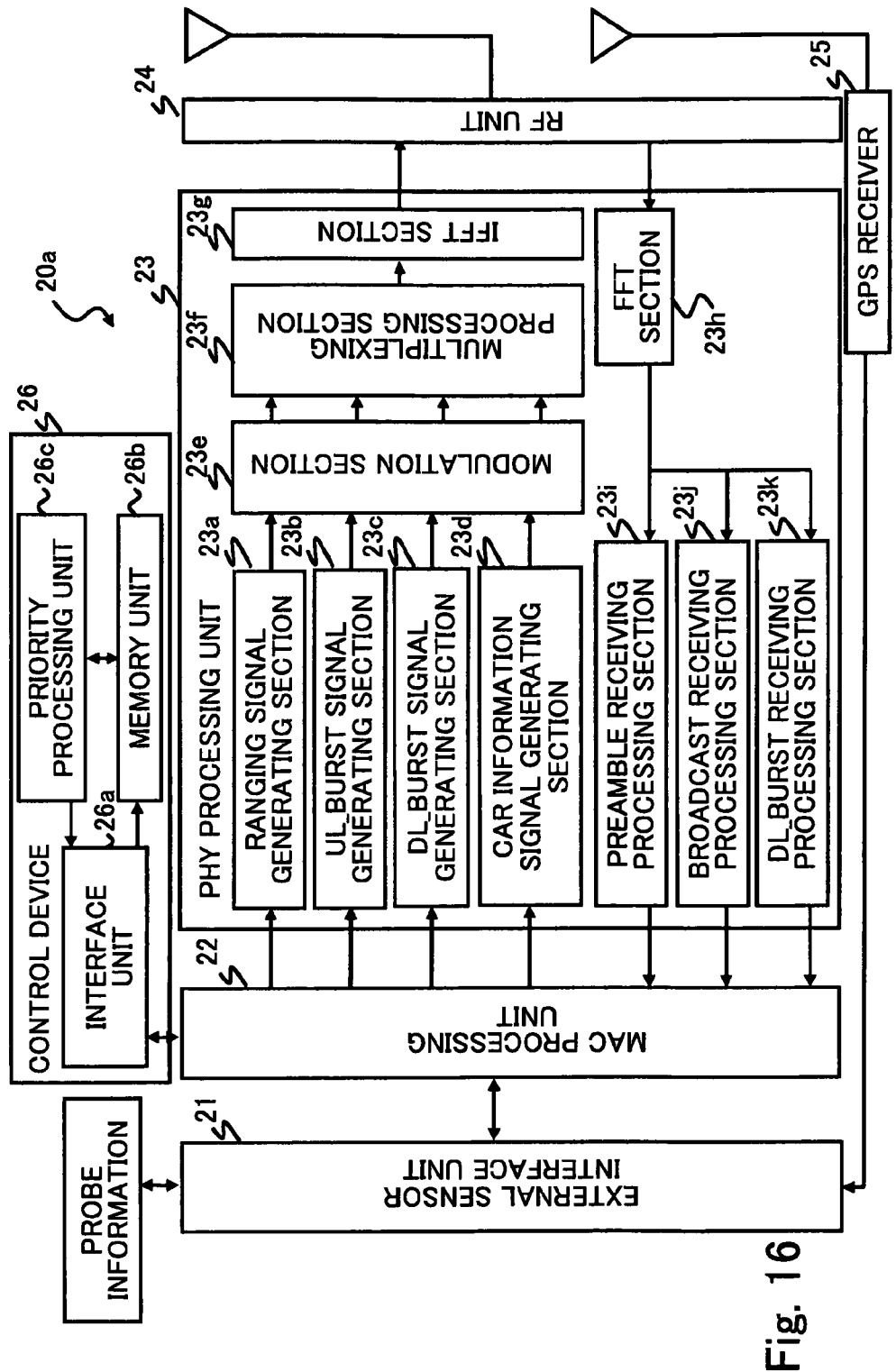
FIG. 16 shows a schematic diagram of a vehicle mounted unit according a third embodiment.
Figure 17:
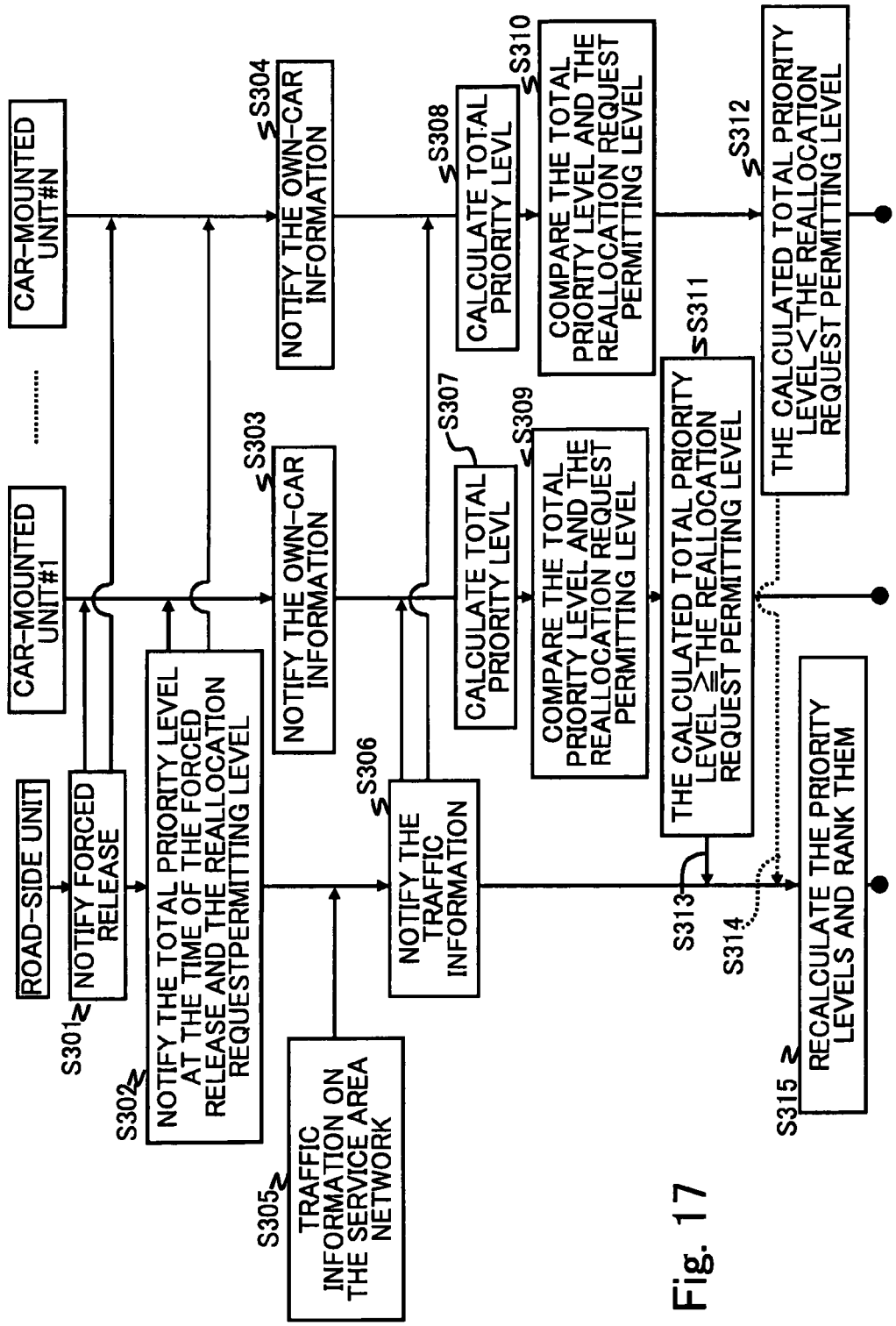
FIG. 17 shows an example of a sequence diagram of time slot allocation process in a wireless resource allocation control system according to the third embodiment.
Figure 18:
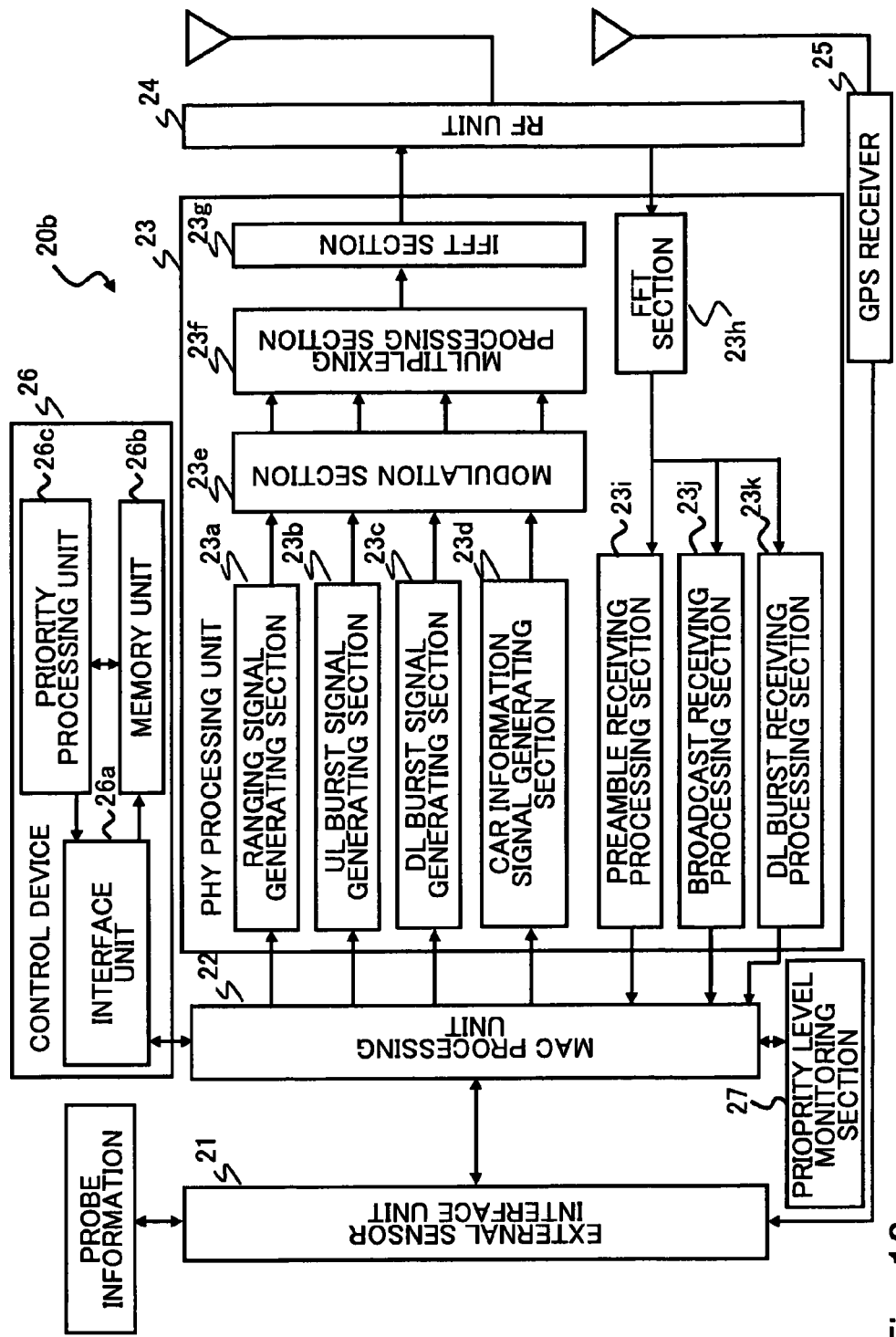
FIG. 18 shows a schematic diagram of a vehicle mounted unit according to a fourth third embodiment.

Now, with reference to FIGS. 16 to 18, the configuration and processing in a wireless resource allocation control system 1b according to a third embodiment will be described in a case that a road-side unit, which has been forced to release the time slot, increases the necessity for information later, and is reallocated a time slot. FIG. 16 is a block diagram showing a configuration of a vehicle-mounted unit 20a according to the third embodiment, and FIG. 17 is a sequence diagram showing a flow of time slot allocation processing by a wireless resource allocation control system according to the third embodiment.

First of all, a configuration of the vehicle-mounted unit 20a according to the third embodiment will be described with reference to FIG. 16. As shown in FIG. 16, the vehicle-mounted unit 20a according to the third embodiment is different from the vehicle-mounted unit 20 shown in FIG. 9 in that the control device 26 includes an interface unit 26a, a memory 26b and a priority processing unit 26c. In the vehicle-mounted unit 20a, the control device 26 calculates the priority levels of vehicle-mounted units based on own-vehicle information and ranks the vehicle-mounted units 20a to 20k according to the calculated priority levels.

The interface unit 26a exchanges data with the MAC processing unit 22. More specifically, the interface unit 26a receives a reallocation request permitting level, which is notified from a road-side unit 10, and traffic information. The memory 26b stores a priority table as illustrated in FIGS. 4 to 7 and FIG. 13.

The priority processing unit 26c calculates a priority level (Total Priority Level) from own-vehicle information and road-to-vehicle information, compares the priority level and a reallocation request permitting level and, if the priority level reaches the reallocation request permitting Level, requests the reallocation to the road-side unit 10. If the priority level does not reach the reallocation request permitting level on the other hand, the reallocation is not requested.

Next, with reference to FIG. 17, processing by the wireless resource allocation control system 1b according to the third embodiment will be described. FIG. 17 is a sequence diagram showing a flow of time slot allocation control processing by a wireless resource allocation control system according to the third embodiment.

As shown in FIG. 17, the road-side unit 10 releases the time slot of a vehicle-mounted unit with a low Total Priority Level (step S301). At the same time, the road-side unit 10 notifies the Total Priority Level at the time of the release of the vehicle-mounted unit and a reallocation request permitting level to the vehicle-mounted unit 20a, which has been forced to release by the road-side unit 10 (step S302). Then, the vehicle-mounted unit 20a, which has been forced to release, obtains own-vehicle information from the outside of the vehicle-mounted unit as required after that (steps S303 and 304). The road-side unit 10 further obtains traffic information from the inside of a service area network (step S305).

Then, the road-side unit 10 notifies the traffic information as road-to-vehicle information to the vehicle-mounted unit 20a (step S306). The vehicle-mounted unit 20a, which has been notified the road-to-vehicle information, calculates a Total Priority Level from the own-vehicle information and the road-to-vehicle information (steps S307 and 308), compares the Total Priority Level and the reallocation request permitting level (steps S309 and 310) and, if the Total Priority Level reaches the reallocation request permitting level (step S311), requests the reallocation (step S313). If the Total Priority Level does not reach the reallocation request permitting level on the other hand (step S312), the reallocation is not requested (step S314). Then, if the reallocation is requested from the vehicle-mounted unit 20a, the road-side unit 10 recalculates the priority levels of the vehicle-mounted units and ranks them (steps S315).

In this way, according to the third embodiment, a time slot can be reallocated when a vehicle-mounted unit, which has been forced to release the wireless resource, increases the necessity for information. In addition, wireless resources can be used effectively since the reallocation is not requested if the priority level for determining the necessity for information does not reach the reallocation permitting level notified from a road-side unit.

[Fourth Embodiment]

Having described the case that a vehicle-mounted unit, which has been forced to release the time slot, is allowed to request the reallocation of a time slot and to be reallocated the time slot according to the third embodiment, the present invention is not limited thereto. The request for reallocation by a predetermined vehicle-mounted unit may be restricted for a predetermined period of time.

Figure 19:
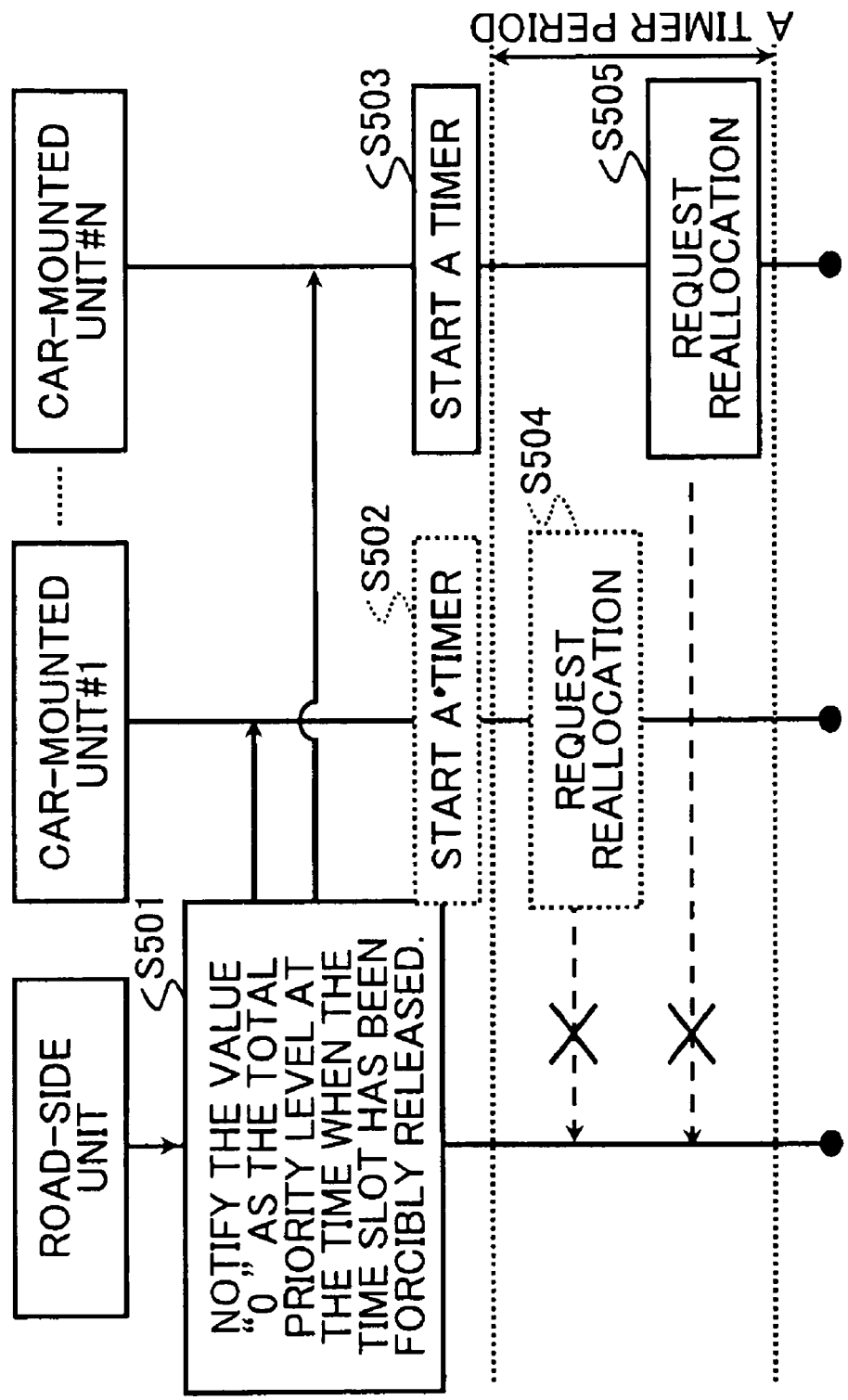
FIG. 19 shows an example of a sequence diagram of time slot allocation process in a wireless resource allocation control system according to the fourth embodiment.

Now, with reference to FIGS. 18 and 19, the configuration and processing of a wireless resource allocation control system 1c according to a fourth embodiment will be described in a case where a vehicle-mounted unit with a low priority level (such as the value "0" of the priority level) is inhibited to request the reallocation within a timer period. FIG. 18 is a block diagram showing a configuration of a vehicle-mounted unit 20b according to the fourth embodiment, and FIG. 19 is a sequence diagram showing a flow of time slot allocation control processing by a wireless resource allocation control system according to the fourth embodiment.

First of all, with reference to FIG. 18, a configuration of a vehicle-mounted unit 20b according to the fourth embodiment will be described. As shown in FIG. 18, the vehicle-mounted unit 20b according to the fourth embodiment is different from the vehicle-mounted unit 20a shown in FIG. 16 in that it further includes a priority level monitoring section 27.

The priority level monitoring section 27 monitors the priority level notified from a road-side unit 10. More specifically, the priority level monitoring section 27 monitors the priority level notified from a road-side unit 10 and, if the value "0" is notified as the priority level from the road-side unit (or if it is determined by the road-side unit 10 that it is outside of a service area), starts a timer, not shown. Then, within a timer period, the reallocation request is controlled to inhibit.

Next, with reference to FIG. 19, the processing by the wireless resource allocation control system 1c according to the fourth embodiment will be described. FIG. 19 is a sequence diagram showing a flow of time slot allocation control processing by a wireless resource allocation control system according to the fourth embodiment.

As shown in FIG. 19, the vehicle-mounted unit 20b if notified from the road-side unit 10 the value "0" as the Total Priority Level at the time when the time slot has been forced to release (step S501) starts a timer (steps S502 and 503), controls to inhibit reallocation request within a timer period (steps S504 and 505) and allows transmission of a reallocation request after a lapse of a predetermined period measured by the timer.

In this way, since a vehicle-mounted unit with a low priority level is inhibited to perform reallocation request within a timer period, the congestion of communication can be prevented, and wireless resources can be effectively used.

[Other Embodiments]

Having described the embodiments of the present invention, the present invention may be implemented in various different forms excluding the above-described embodiments. Other embodiments included in the present invention will be described below.

(1) System Configurations and Others

The components of the shown devices are functionally conceptual and are not necessarily required to physically configure as shown. In other words, the specific forms of distribution and unity of the devices are not limited to the shown ones, but all or a part of them may be configured to distribute or unit functionally or physically in arbitrary units according to the various loads and usages. All or an arbitrary part of the processing functions to be performed by the devices may be implemented by a CPU and a program to be analyzed and executed by the CPU or may be implemented as hardware based on wired logics.

All or a part of the processes described as ones to be performed automatically among the processes described according to the embodiments may be performed manually, or all or a part of the processes described as ones to be performed manually may be performed automatically by a publicly known method. Alternatively, the processing routines, control routines, specific names and information including data and parameters described in the documents and illustrated in the drawings can be changed arbitrarily except for the cases mentioned specifically.

(2) Programs

The wireless resource allocation control methods described with reference to embodiments can be implemented by executing a prepared program by a computer such as a personal computer and a workstation. The program can be distributed over a network such as the Internet. The program may be recorded on a computer-readable recording medium such as a hard disk, a flexible disk (FD), a CD-ROM, an MO and a DVD and can be executed by being read out from the recording medium by a computer.

As described above, the wireless resource allocation control system, road side unit, wireless resource allocation control method and wireless resource allocation control program according to the present embodiment are effective for a case that a road-side unit placed on a road allocates and releases a wireless resource to and from vehicle-mounted units within a predetermined area in which vehicle-mounted units, each of which is mounted in a vehicle, and other vehicle-mounted units communicate by using wireless resources and particularly allow a vehicle-mounted unit, which highly requires information within a service area, to securely communicate and reduces the waste of wireless resources to effectively use the wireless resources.

What is claimed is:

1. A wireless-resource allocation control system for allocating and releasing a wireless-resource used for communication between vehicles in a predetermined area, the wireless-resource allocation system comprising:

a unit mounted in a vehicle, the unit including a transmitter for transmitting first information associated with the vehicle; and a station configured to receive the first information from the unit and sending second information to the unit, the station comprising:

a priority processing unit configured to calculate a total priority level for each of the units on the basis of a first priority level in response to a speed and a second priority level in response to a relation between a direction of movement and a traffic spot associated with the vehicle, based on the information transmitted from each of the units;

a ranking unit configured to rank the units in an order of the total priority level;

a wireless-resource allocation unit configured to allocate wireless-resources to the units in descending total priority levels of the units; and a wireless-resource release unit configured to release the wireless-resource from one of the units to which the wireless-resource has been allocated previously when the one of the units has a total priority level which is lower than the unit.

2. The wireless-resource allocation control system according to claim 1, further comprising:

a traffic information acquisition unit configured to acquire traffic information within the predetermined area, wherein the priority processing unit calculates the total priority level on the basis of the traffic information and the first information.

3. The wireless-resource allocation control system according to claim 1, the unit further comprising:

a request permitting level receiving unit configured to output receive information indicating a level permitting a reallocation request transmitted from the station when the wireless-resource is released by the wireless-resource release unit;

a self priority processing unit configured to calculate a total priority level by use of the first information posterior to a release of the wireless-resource by the wireless-resource release unit; and a reallocation request unit configured to issue a request to the station for reallocation of the wireless-resource in the case that the total priority level calculated by the self priority processing unit equals or exceeds the level permitting the reallocation request, and the station further comprising:

a notification unit configured to notify the level permitting the reallocation request to the unit, the wireless-resource allocated to the unit having been released by the wireless-resource release unit, wherein the priority processing unit calculates the total priority level for the unit.

4. The wireless-resource allocation control system according to claim 3, the unit further comprising:

a total priority level monitoring unit configured to monitor the total priority level transmitted from the station; and a timer starting unit configured to start a timer for measuring a predetermined period upon detecting that the total priority level monitored by the total priority level monitoring unit is smaller than a predetermined threshold level of the total priority level, wherein the reallocation request unit issues the request to the station for the reallocation of the wireless-resource.

5. A station performing an allocation and a release of a wireless-resource used for communication between units mounted in vehicles in a predetermined area, the station comprising:

a memory configured to store a first priority level in response to a speed and a second priority level in response to a relation between a direction of movement and a traffic spot associated with the vehicle, based on the information transmitted from each of the units;

a priority processing unit configured to calculate a total priority level for each of the units on the basis of the first priority level and the second priority level in the memory, based on the information transmitted from each of the units;

a ranking unit configured to rank the units in the order of the total priority level;

a wireless-resource allocation unit configured to allocate wireless-resources to the units in descending total priority levels; and a wireless-resource release unit configured to release the wireless-resource from one of the units to which the wireless-resource has been allocated previously when the one of the units has a priority level which is lower than another one of the units.

6. A method for allocating and releasing wireless-resource by a station, the wireless-resource being used for communication between units mounted in individual vehicles, the method comprising:

transmitting first information from a unit mounted in a vehicle to the station;

calculating a total priority level for each of the units on the basis of a first priority level in response to a speed and a second priority level in response to a relation between a direction of movement and a traffic spot associated with the vehicle, based on the information transmitted from each of the units;

ranking the units in an order of the total priority level;

allocating the wireless-resources to the units in descending total priority levels of the units; and releasing the wireless-resource from one of the units to which the wireless-resource has been allocated previously when the one of the units has a total priority level which is lower than the unit.

7. A non-transitory computer readable storage medium including instructions executing a method for allocating and releasing wireless-resource by a station, the wireless-resource being used for communication between units mounted in en individual vehicles, the method comprising:

transmitting first information from a unit mounted in en a vehicle to the station by use of a computer included in the unit;

calculating a total priority level for each of the units on the basis of a first priority level in response to a speed and a second priority level in response to a relation between a direction of movement and a traffic pot associated with the vehicle, based on the information transmitted from each of the units by use of a computer included in the station;

ranking the units in an order of the total priority level by use of the computer included in the station;

allocating the wireless-resources to the units in descending total priority levels of the units by use of the computer included in the station; and releasing the wireless-resource from one of the units to which the wireless-resource has been allocated previously when the one of the units has a total priority level which is lower than the unit by use of the computer included in the station.

* * * * *